126,803

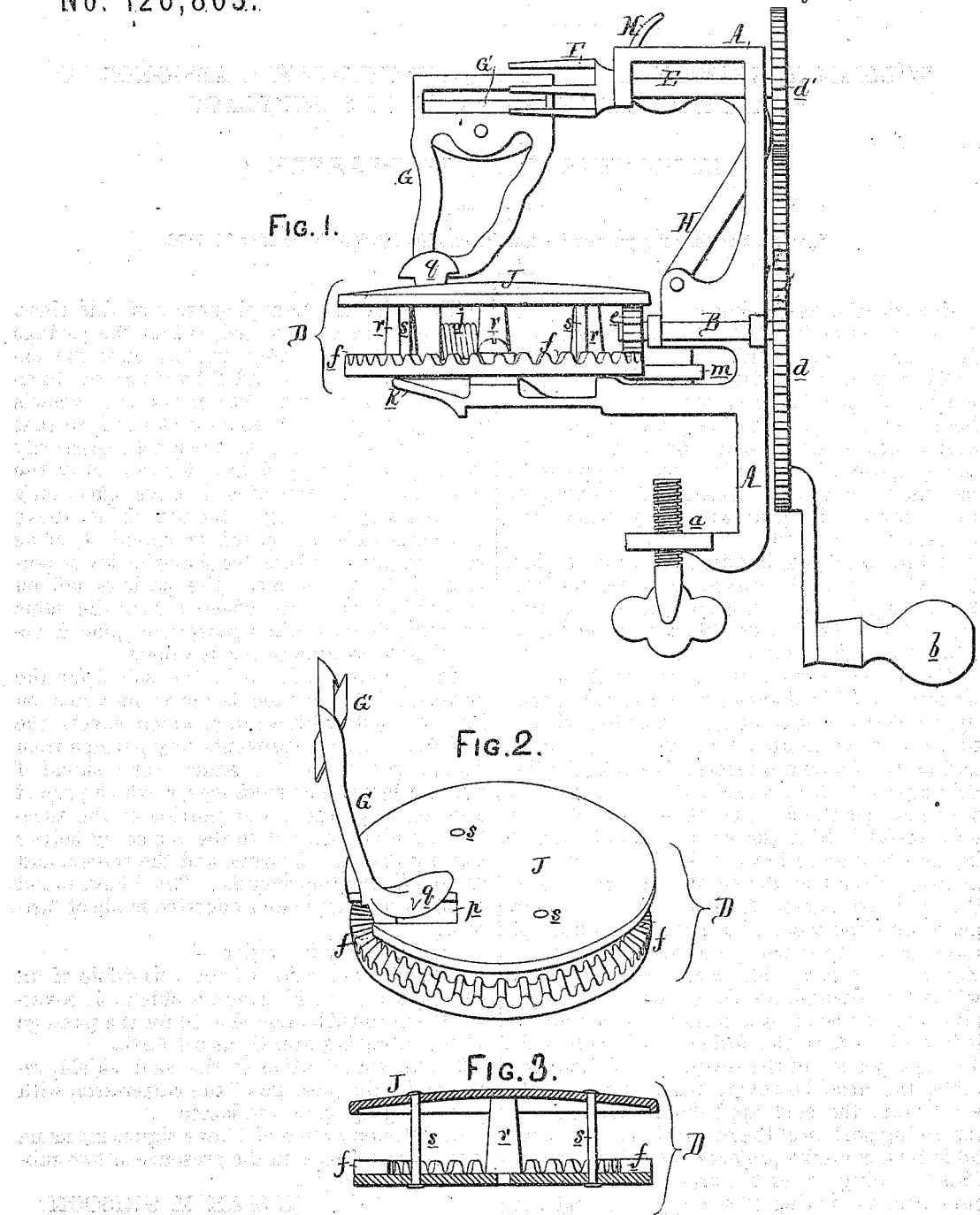

UNITED STATES PATENT OFFICE.

WILLIAM M. GRISCOM, OF READING, PENNSYLVANIA, ASSIGNOR TO "HARBSTER BROTHERS & CO.," OF SAME PLACE.

IMPROVEMENT IN APPLE-PARERS.

Specification forming part of Letters Patent No. 126,803, dated May 14, 1872.

Specification describing an Improved Apple-Parer, invented by WILLIAM M. GRISCOM, of Reading, Pennsylvania.

My invention consists of certain improvements in apple-parers, too fully explained hereafter to need preliminary description, the said improvements having been designed for the purpose of preventing the lodgment of parings upon and the consequent clogging of the teeth of the gear-wheels by which the turn-table is rotated.

In the accompanying drawing, Figure 1 is a side view of my improved apple-parer; Fig. 2, a perspective view illustrating my improvement; and Fig. 3, a detached sectional view of part of the machine.

The lower portion of the frame A of the machine is made of such a shape as to be readily fitted to the edge of a table or bench, and to be secured thereto by a thumb-screw, $a$, and on the frame are formed bearings for the driving-shaft B, turn-table D, and spindle E which carries the forked apple-holder F. The driving-shaft B is turned by a crank, $b$, and imparts motion to the spindle E through two gear-wheels, $d$ and $d'$, and on the inner end of the said driving-shaft is a pinion, $e$, which gears into the teeth of a horizontal wheel, $f$, forming the lower portion of the turn-table D, Fig. 2. This turn-table carries the arm G, to which the paring-knife G' is secured, the said arm being acted on by a spring, $j$, which forces it inward toward the forked apple-holder F, during a portion of the revolution of the turn-table, the arm, however, being thrown outward from the said apple-holder during the remaining portion of the revolution of the turn-table by a cam-like projection, $k$, of the frame. This throwing out of the arm G and knife occurs after the paring of the apple, so that the latter can be pushed off of the holder by a spring-arm, H, hung to the frame, and operated by a cam, $m$, on the edge of the turn-table.

The objection to apple-parers of this class, as heretofore constructed, is that the parings are permitted to drop directly onto the exposed gear-wheels $e$ and $f$, by which the turn-table is rotated, the teeth of the said wheels consequently soon becoming clogged, so that the operation of the machine must necessarily be frequently stopped in order to remove the parings. This objection I have effectually overcome by securing to the turn-table, above the gear-wheels, a guard or shield, J, of as great or greater diameter than the lower portion of the turn-table. The parings fall on this shield, and are deflected from the same onto the floor or into a receptacle placed beneath the machine to receive them.

An opening, $p$, is cut in the shield for the cutter-arm G; but the latter is provided on its inner side with a lip, $q$, which covers the said opening, and prevents any parings from dropping through the same. The shield J rests upon three or more legs, $r$, which project upward from the lower portion of the turn-table, and is secured to the latter by bolts $s$ passing through the same and the screen, and riveted at their lower ends. This I have found to be a very simple and effective mode of fastening.

I claim as my invention—

1. The combination of the turn-table of an apple-paring machine and a shield, J, covering the turn-table, and slotted for the passage of the vibrating arm G, as set forth.

2. The combination of the said shield, recessed for the passage of the cutter-arm, with a covering-lip, $q$, on the latter.

In testimony whereof I have signed my name to this specification in the presence of two subscribing witnesses.

WILLIAM M. GRISCOM.

Witnesses:
  JOHN W. RUTH,
  E. J. RICHARDS.